Oct. 27, 1925.

R. W. OAKLEY 1,559,355

TOOL FOR PUTTING ON OR REMOVING TIRES FROM THE RIMS OF VEHICLES

Filed April 21, 1924

INVENTOR.
R. W. Oakley
BY J. Edward Marbee
ATTY.

Patented Oct. 27, 1925.

1,559,355

UNITED STATES PATENT OFFICE.

ROBERT WILLIAM OAKLEY, OF TORONTO, ONTARIO, CANADA.

TOOL FOR PUTTING ON OR REMOVING TIRES FROM THE RIMS OF VEHICLES.

Application filed April 21, 1924. Serial No. 707,983.

*To all whom it may concern:*

Be it known that I, ROBERT WILLIAM OAKLEY, of the city of Toronto, in the county of York, Province of Ontario, Canada, a subject of the King of Great Britain, have invented certain new and useful Improvements in Tools for Putting on or Removing Tires from the Rims of Vehicles, of which the following is a specification.

Considerable difficulty is experienced by drivers of motor cars in removing and replacing tires from the rims, as is often necessary in case of puncture or blow-out, owing to the fact that the tire must necessarily be a tight fit when in position on the rim and must be sprung over the edge of the rim when the tire is being removed or replaced as the tools often slip allowing the tire to slip back. The tool also often damages the tire or the tube enclosed within the tire.

The object of my invention therefore is to devise a tool which has such an engagement with the rim, when the tire is being placed in position, that there is little danger of it slipping, and by means of which the removal of a tire may be facilitated.

I attain my object by means of the constructions hereinafter described and illustrated in the accompanying drawings in which—

Figure 1:
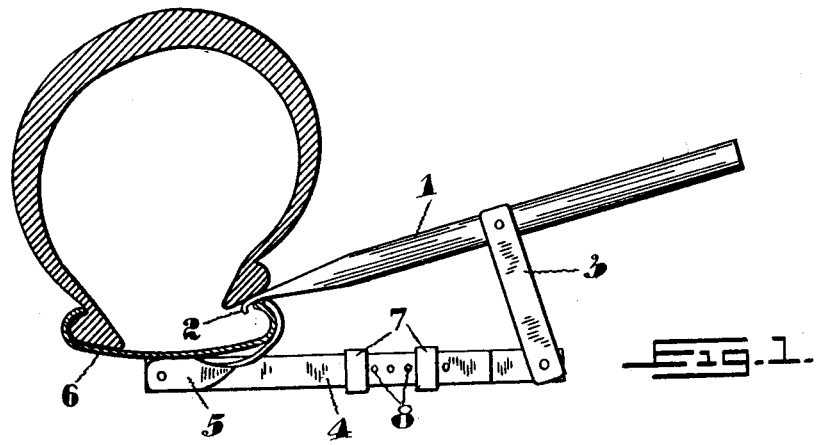
Figure 2:
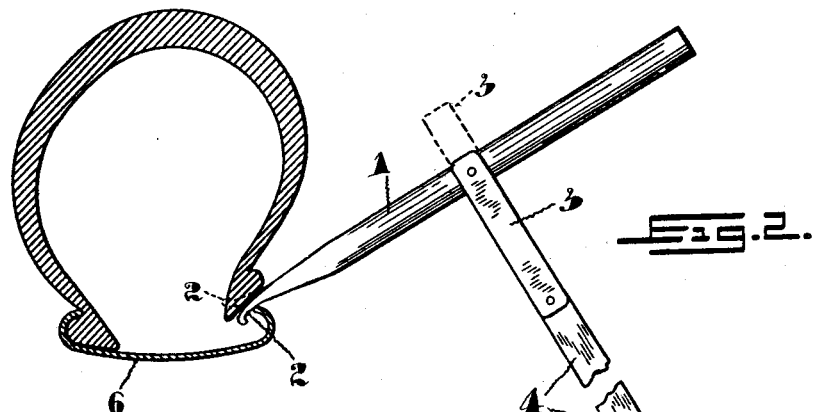

Fig. 1 is a side elevation of my improved tool showing it in position for assisting the placing of a tire on a rim;

Fig. 2 a side elevation showing how the tool is used in removing a tire; and

Figure 3:
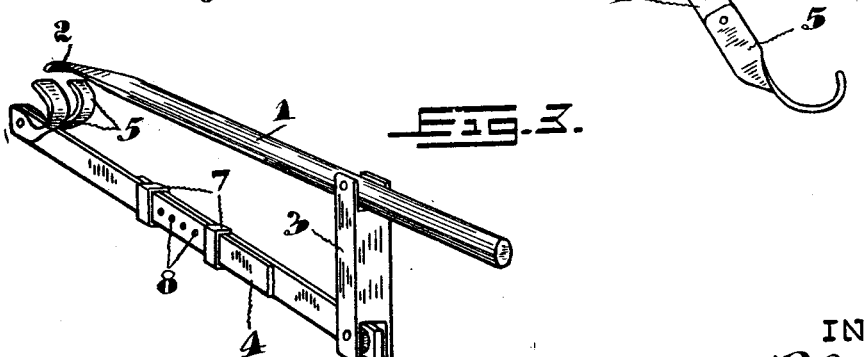

Fig. 3 a perspective view of my tool as used in placing a tire on a rim.

The device comprises a lever 1, having a wedge-shaped end which wedge-shaped end 2 is preferably somewhat curved. Substantially midway between the ends of the lever is pivoted the link 3. This link is preferably formed of channel section, and the bottom of the channel is cut away to allow the sides to receive between them the lever 1. The cut away end of the bottom of the channel, as will be seen from Fig. 3, engages the lever to limit its movement in one direction.

Pivotally connected with the other end of this link is one end of the bar 4, the other end of which bar has pivotally connected thereto the hook members 5. It will be noted on reference to Fig. 1 that the curve of the wedge-shaped end of the lever 1 is directed towards the bar 4. In order that the device may be used for different sized tires, I preferably form the bar 4 in two parts which are adjustable longitudinally of one another. Guides 7 are formed on one part, through which the other part may slide, while a series of holes 8 are provided in which a suitable pin may be inserted to hold the parts in the desired position.

In placing a tire in position on a rim, the device is used as follows. The hook members 5 are engaged with the rim 6 as shown in Fig. 1, with the bar 4 lying substantially parallel to the under side of the rim. The curved pointed end of the lever 1 is then engaged with the rim, the bead of the tire lying on the lever. The outer end of the lever is then swung upwardly until the tire bead is in such a position that it will engage under the hook edge of the rim. As the lever is swung upwardly, the bar 4 is drawn upwardly by the link 3, and the hook members, while retaining their engagement with the rim, will be drawn around to a substantially vertical position. By using these hook members and connections with the lever, the danger of the lever accidentally slipping is reduced to a minimum. Two or more of these tools may be used if desired at points along the circumference of the tire if found desirable.

When it is desired to remove a tire, the curved pointed end of the lever is engaged between the bead and rim the curved portion being turned down. The link 3, bar 4, and hooks 5 are all extended in a line at a right angle to the lever 1, as shown in full lines in Fig. 2. One hand is engaged with the outer end of the lever 1 and the other hand engaged with the hook members, which are then swung to cause the lever to rotate to the position shown in dotted lines in Fig. 2. As the lever is rotated the curved point is forced upward engaging the bead and forcing it away from the rim. The tire is then easily sprung over the edge of the rim.

From the above description it will be seen that I have devised a construction which will satisfactorily attain the objects of my invention.

What I claim is:—

1. In a tool for putting on or removing tires from the rims of vehicles, the combination of a lever having a wedge-shaped end adapted to be engaged with the edge of the rim when the tire is to be placed in position or inserted between the tire and edge of the rim when the tire is to be removed; a bar; a link having one end pivotally connected intermediate the ends of said lever, the other end of said link being pivotally connected with one end of said bar; and a hook member pivotally connected with the other end of said bar, said link, bar and hook member being adapted to occupy a position when the tire is to be placed in position with the hook member in engagement with the rim adjacent the wedge-shaped end, or a position, when a tire is to be removed, with said link bar and hook member in substantially a straight line at right angles to the lever.

2. In a tool for putting on or removing tires from the rims of vehicles, the combination of a lever having a wedge-shaped end adapted to be engaged with the edge of the rim when the tire is to be placed in position or inserted between the tire and edge of the rim when the tire is to be removed; a bar; a link having one end pivotally connected intermediate the ends of said lever, the other end of said link being pivotally connected with one end of said bar, said link being adapted to engage the lever whereby its movement in one direction is limited; and a hook member pivotally connected with the other end of said bar, said link, bar and hook member being adapted to occupy a position when the tire is to be placed in position with the hook member in engagement with the rim adjacent the wedge-shaped end, or a position, when a tire is to be removed, with said link bar and hook member in substantially a straight line at right angles to the lever.

3. In a tool for putting on or removing tires from the rims of vehicles, the combination of a lever having a wedge-shaped end adapted to be engaged with the edge of the rim when the tire is to be placed in position or inserted between the tire and edge of the rim when the tire is to be removed; a bar adjustable in length; a link having one end pivotally connected intermediate the ends of said lever, the other end of said link being pivotally connected with one end of said bar; and a hook member pivotally connected with the other end of said bar, said link, bar and hook member being adapted to occupy a position when the tire is to be placed in position with the hook member in engagement with the rim adjacent the wedge-shaped end, or a position, when a tire is to be removed, with said link bar and hook member in substantially a straight line at right angles to the lever.

4. In a tool for putting on or removing tires from the rims of vehicles, the combination of a lever having a wedge-shaped end adapted to be engaged with the edge of the rim when the tire is to be placed in position or inserted between the tire and edge of the rim when the tire is to be removed, said wedge-shaped end being curved longitudinally thereof; a bar; a link having one end pivotally connected intermediate the ends of said lever, the other end of said link being pivotally connected with one end of said bar; and a hook member pivotally connected with the other end of said bar, said link, bar and hook member being adapted to occupy a position when the tire is to be placed in position with the hook member in engagement with the rim adjacent the wedge-shaped end, or a position, when a tire is to be removed, with said link bar and hook member in substantially a straight line at right angles to the lever.

5. In a tool for putting on or removing tires from the rims of vehicles, the combination of a lever having a wedge-shaped end adapted to be engaged with the edge of the rim when the tire is to be placed in position or inserted between the tire and edge of the rim when the tire is to be removed, said wedge-shaped end being curved longitudinally thereof; a bar adjustable in length; a link having one end pivotally connected intermediate the ends of said lever, the other end of said link being pivotally connected with one end of said bar; and a hook member pivotally connected with the other end of said bar, said link, bar and hook member being adapted to occupy a position when the tire is to be placed in position with the hook member in engagement with the rim adjacent the wedge-shaped end, or a position, when a tire is to be removed, with said link bar and hook member in substantially a straight line at right angles to the lever.

6. In a tool for putting on or removing tires from the rims of vehicles, the combination of a lever having a wedge-shaped end adapted to be engaged with the edge of the rim when the tire is to be placed in position or inserted between the tire and edge of the rim when the tire is to be removed; said wedge-shaped end being curved longitudinally thereof; a bar; a link having one end pivotally connected intermediate the ends of said lever, the other end of said link being pivotally connected with one end of said bar, said link being adapted to engage the lever, whereby its movement in one direction is limited; and a hook member pivotally connected with the other end of said bar, said link, bar and hook member being adapted to occupy a position when the tire is to be placed in position with the hook member in engagement with the rim adjacent the wedge-shaped end, or a position, when a tire is to be removed, with said link bar and hook member in substantially a straight line at right angles to the lever.

7. In a tool for putting on or removing tires from the rims of vehicles, the combination of a lever having a wedge-shaped end adapted to be engaged with the edge of the rim when the tire is to be placed in position or inserted between the tire and edge of the rim when the tire is to be removed, said wedge-shaped end being curved longitudinally thereof, the curve, when the lever and bar are lying adjacent one another, being directed towards the bar; a bar; a link having one end pivotally connected intermediate the ends of said lever, the other end of said link being pivotally connected with one end of said bar; and a hook member pivotally connected with the other end of said bar, said link, bar and hook member being adapted to occupy a position when the tire is to be placed in position with the hook member in engagement with the rim adjacent the wedge-shaped end, or a position, when a tire is to be removed, with said link bar and hook member in substantially a straight line at right angles to the lever.

Signed at Toronto, Canada, this 9th day of April, 1924.

ROBERT WILLIAM OAKLEY.